E. J. DRISCOLL.
SAW GAGE.
APPLICATION FILED SEPT. 2, 1913.
1,123,711. Patented Jan. 5, 1915.
2 SHEETS—SHEET 1.
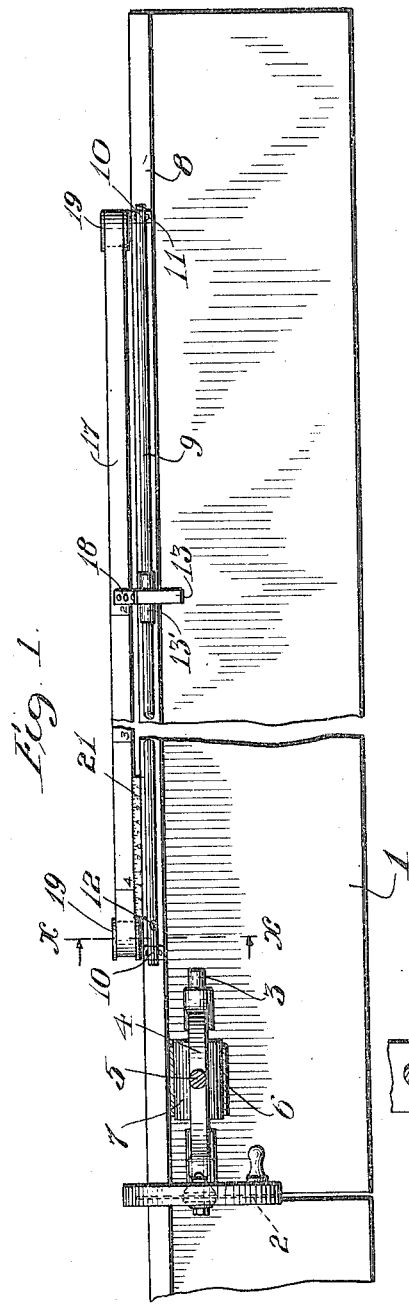
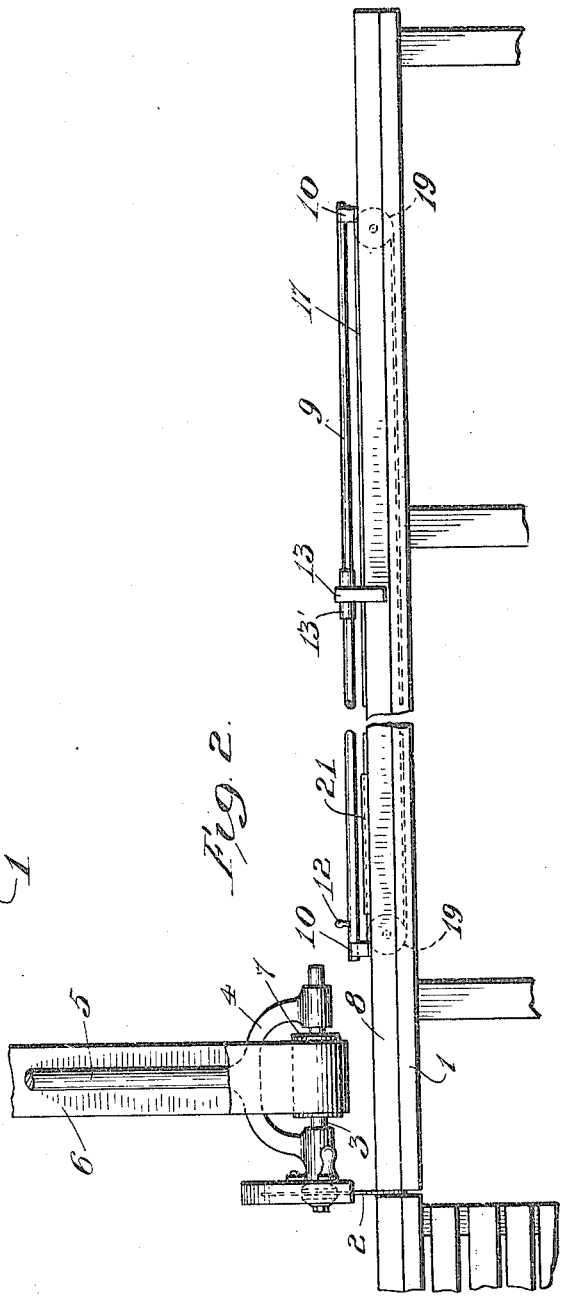
Witnesses:
H. J. Bull
A. A. Olson
Inventor
Edward J. Driscoll
By Joshua R. H. Potts
His Attorney

UNITED STATES PATENT OFFICE.

EDWARD J. DRISCOLL, OF CHICAGO, ILLINOIS.

SAW-GAGE.

1,123,711.

Specification of Letters Patent.

Patented Jan. 5, 1915.

Application filed September 2, 1913. Serial No. 787,655.

*To all whom it may concern:*

Be it known that I, EDWARD J. DRISCOLL, a citizen of the United States, and a resident of the city of Chicago, county of Cook, and State of Illinois, have invented certain new and useful Improvements in Saw-Gages, of which the following is a specification.

My invention relates to improvements in saw gages and has for its object the production of a gage of this character adapted for ready and expeditious adjustment, one which will be of durable and economical construction, and one which will be efficient in operation.

Other objects will appear hereinafter.

The invention consists in the combinations and arrangements of parts hereinafter described and claimed.

Figure 3:
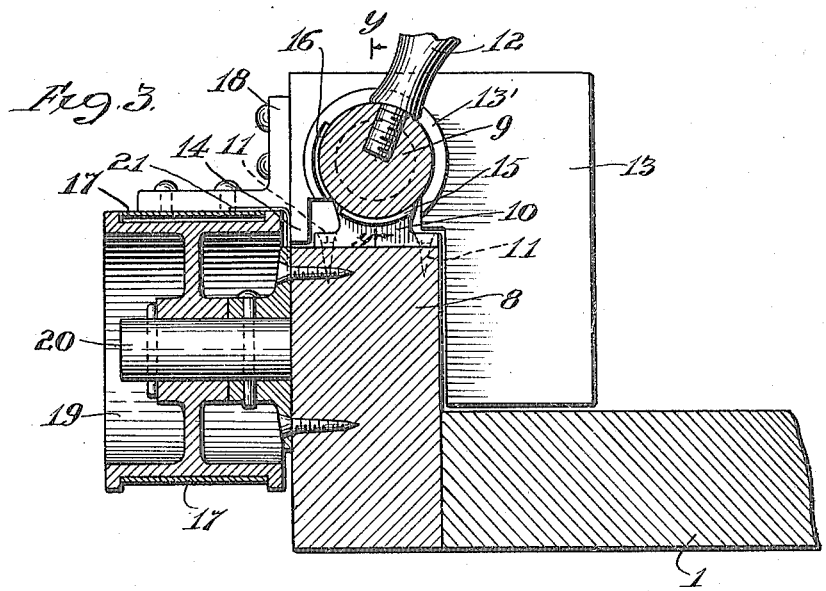
Figure 4:
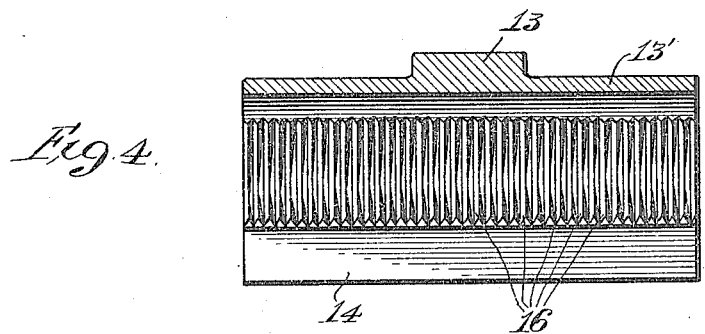
Figure 5:
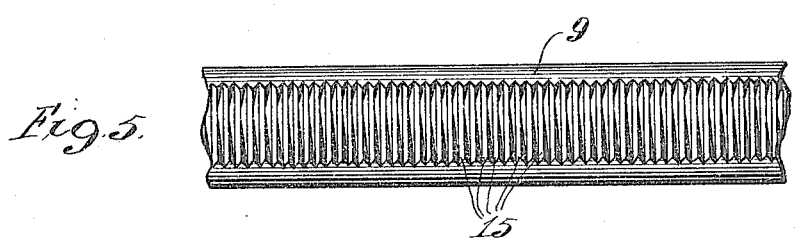

The invention will be best understood by reference to the accompanying drawings forming a part of this specification, and in which, Figure 1 is a plan view of a saw and the coöperating table thereof to which is applied a gage embodying my invention, Fig. 2 is a front elevation of the construction shown in Fig. 1, Fig. 3 is an enlarged section taken on line $x$—$x$ of Fig. 1, Fig. 4 is an enlarged section of the gage member of the device taken on substantially line $y$—$y$ of Fig. 3, and Fig. 5 is a bottom plan view of a fragment of the rockingly mounted guiding member embodied in the invention.

The preferred form of construction as illustrated in the drawings comprises a table 1 in operative proximity with which is arranged a circular saw blade 2 carried by a spindle 3 which is mounted in bearings 4 provided at the lower end of a bar or beam 5 which is pivotally or hingedly secured at its upper end to a suitable support so as to permit of the blade 2 being moved across or transversely of the table 1 as will be readily understood. The spindle 3 is driven through the medium of a belt 6 which passes around a pulley 7 secured to said spindle as shown. This construction is old and well known, no claim being here made thereto.

The gage which is designed for coöperation with the blade 2 is arranged at the rearward edge of the table 1 mounted upon the upwardly projecting flange 8 provided at said edge of the table. The gage comprises an elongated cylindrical bar 9 mounted at its respective extremities in suitable bearings 10 which are secured by means of screws or other suitable fastening devices 11 to the flange 8. The upper portions of the bearings 10 engage circumferentially extending grooves provided in the guide bar 9, as clearly shown in Fig. 3, so that the outer surfaces of said bearing members will be flush with the corresponding surface of said guide bar. The guide bar 9 is mounted for rocking adjustment in the bearings 10, a radially disposed handle 12 being provided upon said bar for effecting ready manual rocking thereof.

Loosely mounted upon the guide bar 9 for free longitudinal sliding thereon is the gage member 13 of angular form, as clearly shown in Fig. 3, the front lower portion of said gage member being positioned adjacent to the front edge of the flange 8 and the top surface of the table 1 for engagement with the work arranged upon said table and positioned against said flange, as will be readily understood. The upper rearwardly projecting portion of the gage member 13 is provided with a circular recess or opening for snug engagement with the guide bar 9, said portion of said gage member being formed with lateral extensions 13′ in order to afford a greater surface for engagement of said gage member with said bar. Said gage member is locked against rotary movement in one direction by engagement of the lower end thereof with the front side of flange 8, rocking movement of said gage member in the opposite direction being prevented by a depending flange 14 provided at the rearward end of said gage member which is adapted to contact with the upper side of said flange 8, as clearly shown in Fig. 3.

Provided at the under side of the guide bar 9 are transversely or circumferentially extending teeth 15 adapted, when said guide bar is properly rocked, to engage correspondingly positioned teeth 16 formed in the contacting surface of the gage member 13. The arrangement is such, as will be observed, that when the teeth 15 of guide bar 9 are in engagement with the teeth 16 of said gage member, the latter will be locked against longitudinal movement, unlocking of said gage member, in order to permit of longitudinal adjustment thereof upon guide rod 9, being permitted only upon rocking of said guide bar to disengage the teeth 15 from the teeth 16. With this arrangement then, when the teeth 15 are positioned out of engagement with the teeth 16, the gage member 13 will be unlocked and free for longitudinal adjustment upon guide rod 9 or relative to the saw table. When said gage member is in adjusted position, the same may be securely locked in its position of adjustment by simply rocking the bar 9, through engagement with the handle 12 thereof, to effect engagement of the teeth 15 of said bar with the teeth 16. In order to facilitate or insure interlocking of said teeth, when the bar 9 is rocked to operative position, the extremities of said teeth are tapered, as clearly shown in Figs. 4 and 5, said teeth, with this arrangement, being adapted to readily engage with each other even though the same are not in exact alinement when the bar is rocked.

Coöperating with the gage member 13 is an endless graduated band 17 rigidly connected with said gage member by means of an angular member 18, as clearly shown in Figs. 1 and 3. The band 17 is mounted for travel around channel rollers 19 mounted upon stud shafts 20 which are arranged at the rearward side of the flange 8 as shown in the several views. Coöperating with the band 17 is a stationary graduated member or scale 21 which is secured to the rearward side of the flange 8, as clearly shown in Figs. 1 and 3, the graduations upon the member 21 being more minute than those upon the band 17, inches and fractions of inches being preferably indicated by the member 21 whereas feet are preferably indicated by the graduations upon said band 17. The arrangement is such, as will be observed, that said graduations will serve to indicate the distance of the gage member 13 from the saw blade, the number of feet being indicated by the graduation upon the member 17 registering with the member 21, and the fractions of feet or inches being indicated by the graduation upon said member 21 with which said graduation of the band 17 is registering.

With the arrangement as set forth, it will be seen that adjustment of the gage member 13 to any desired distance from the saw blade may be effected easily and expeditiously, the graduations above referred to aiding in the correct positioning of the gage member relative to the saw blade. After adjustment of the gage member to the desired position, the same may be readily locked by downward or forward oscillation of the handle 12, since such oscillation of the latter moves the bar 9 to locking position. The construction is simple and economical, the same may be readily and easily adjusted or manipulated, and will be found highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A saw gage comprising, in combination with a table, a movably mounted guide member mounted upon said table; a gage member slidably mounted upon said guide member, said guide member, when moved to a certain position, being adapted to lock said gage member in positions of adjustment thereon; and means for actuating said guide member, substantially as described.

2. A saw gage comprising, in combination with a table having a flange disposed longitudinally thereof; a guide having limited rotary movement mounted above said flange; a gage slidably mounted on said guide and having portions engaging the lateral sides of said flange preventing rotary movement of said gage on said guide; and a releasable connection between said guide and gage, substantially as described.

In testimony whereof I have signed my name to this specification in the presence of two subscribing witnesses.

EDWARD J. DRISCOLL.

Witnesses:
A. A. OLSON,
HELEN F. LILLIS.

Copies of this patent may be obtained for five cents each, by addressing the "Commissioner of Patents, Washington, D. C."